(12) United States Patent
Kawai

(10) Patent No.: US 12,006,266 B2
(45) Date of Patent: Jun. 11, 2024

(54) BAKING SLURRY COMPOSITION, GREEN SHEET, METHOD FOR MANUFACTURING GREEN SHEET, METHOD FOR MANUFACTURING SINTERED PRODUCT, AND METHOD FOR MANUFACTURING MONOLITHIC CERAMIC CAPACITOR

(71) Applicant: GOO CHEMICAL CO., LTD., Kyoto (JP)

(72) Inventor: Yutaka Kawai, Kyoto (JP)

(73) Assignee: GOO CHEMICAL CO., LTD., Kyoto (JP)

( * ) Notice: Subject to any disclaimer, the term of this patent is extended or adjusted under 35 U.S.C. 154(b) by 822 days.

(21) Appl. No.: 17/043,006

(22) PCT Filed: Mar. 13, 2019

(86) PCT No.: PCT/JP2019/010213
§ 371 (c)(1),
(2) Date: Sep. 29, 2020

(87) PCT Pub. No.: WO2020/183637
PCT Pub. Date: Sep. 17, 2020

(65) Prior Publication Data
US 2021/0009477 A1  Jan. 14, 2021

(51) Int. Cl.
| | | |
|---|---|---|
| *C08L 33/02* | (2006.01) | |
| *C04B 35/26* | (2006.01) | |
| *C04B 35/626* | (2006.01) | |
| *C04B 35/634* | (2006.01) | |
| *C04B 35/64* | (2006.01) | |
| *C04B 37/00* | (2006.01) | |
| *C08L 29/04* | (2006.01) | |
| *H01G 4/30* | (2006.01) | |
| *C08K 3/22* | (2006.01) | |
| *C08K 3/40* | (2006.01) | |

(52) U.S. Cl.
CPC .......... *C04B 35/6264* (2013.01); *C04B 35/26* (2013.01); *C04B 35/63424* (2013.01); *C04B 35/64* (2013.01); *C04B 37/001* (2013.01); *C08L 29/04* (2013.01); *H01G 4/306* (2013.01); *C04B 2235/3272* (2013.01); *C04B 2235/606* (2013.01); *C04B 2237/34* (2013.01); *C08K 2003/2227* (2013.01); *C08K 2003/2272* (2013.01); *C08K 3/40* (2013.01); *C08L 33/02* (2013.01)

(58) Field of Classification Search
None
See application file for complete search history.

(56) References Cited

U.S. PATENT DOCUMENTS

| | | |
|---|---|---|
| 6,596,799 B1 | 7/2003 | Harada |
| 2003/0134926 A1 | 7/2003 | Fukada et al. |
| 2003/0167634 A1 | 9/2003 | Nakao |
| 2004/0260020 A1 | 12/2004 | Miyake et al. |
| 2006/0096692 A1 | 5/2006 | Sato et al. |
| 2008/0274376 A1 | 11/2008 | Kishida |
| 2009/0054579 A1 | 2/2009 | Nakamae |
| 2011/0049434 A1 | 3/2011 | Ootsuki et al. |
| 2011/0091666 A1 | 4/2011 | Wang et al. |
| 2012/0041123 A1 | 2/2012 | Ootsuki et al. |
| 2014/0256863 A1 | 9/2014 | Shimazumi |
| 2017/0226298 A1 | 8/2017 | Friedrich et al. |
| 2020/0385546 A1 | 12/2020 | Katahira et al. |

FOREIGN PATENT DOCUMENTS

| | | |
|---|---|---|
| CN | 1834146 A | 9/2006 |
| CN | 1310259 C | 4/2007 |
| CN | 101351483 A | 1/2009 |
| CN | 101384521 A | 3/2009 |
| CN | 103842313 A | 6/2014 |
| CN | 104250096 A | 12/2014 |
| CN | 105000906 A | 10/2015 |
| CN | 106687505 A | 5/2017 |
| CN | 107108920 A | 8/2017 |
| CN | 108911753 A | 11/2018 |
| JP | S5363409 A | 6/1978 |
| JP | S59156959 A | 9/1984 |
| JP | S62191458 A | 8/1987 |
| JP | H6237054 A | 8/1994 |
| JP | 200095572 A | 4/2000 |
| JP | 2000277372 A | 10/2000 |
| JP | 200189671 A | 4/2001 |
| JP | 2001106580 A | 4/2001 |
| JP | 2001302356 A | 10/2001 |
| JP | 200297069 A | 4/2002 |

(Continued)

OTHER PUBLICATIONS

Office Action in CN application No. 201980004470.6, dated Jul. 18, 2022. 36pp.
Office Action in CN application No. 201980004464.0, dated Jul. 8, 2022. 22pp.
Office Action in CN application No. 201980004463.6, dated Jul. 1, 2022. 25pp.
Office Action in TW application No. 109107756, dated Aug. 5, 2022. 15pp.
Office Action in TW application No. 109107794, dated Aug. 5, 2022. 13pp.

(Continued)

*Primary Examiner* — Richard A Huhn
(74) *Attorney, Agent, or Firm* — HAUPTMAN HAM, LLP

(57) ABSTRACT

A baking slurry composition for producing a green sheet of the present invention contains inorganic powder, a polyvinyl alcohol resin, acrylic polymer, and water. The acrylic polymer has a glass transition temperature higher than or equal to −50° C. and lower than or equal to 30° C. and an acid value greater than or equal to 50 mg KOH/g and less than or equal to 200 mg KOH/g. The acrylic polymer has a weight percentage of more than or equal to 0.1 and less than or equal to 5.0 relative to a total solid content of the baking slurry composition.

10 Claims, No Drawings

(56) References Cited

FOREIGN PATENT DOCUMENTS

| | | |
|---|---|---|
| JP | 2002284579 A | 10/2002 |
| JP | 2003183325 A | 7/2003 |
| JP | 2003192451 A | 7/2003 |
| JP | 2004231428 A | 8/2004 |
| JP | 2005113133 A | 4/2005 |
| JP | 2005162572 A | 6/2005 |
| JP | 2007261821 A | 10/2007 |
| JP | 2007261941 A | 10/2007 |
| JP | 2009182132 A | 8/2009 |
| JP | 2011236304 A | 11/2011 |
| JP | 201496231 A | 5/2014 |
| JP | 2015202987 A | 11/2015 |
| JP | 2017119606 A | 7/2017 |
| JP | 20182991 A | 1/2018 |
| JP | 201879616 A | 5/2018 |
| TW | 200300137 A | 5/2003 |
| TW | 201202404 A1 | 1/2012 |
| WO | 2007126067 A1 | 11/2007 |
| WO | 2008143195 A1 | 11/2008 |
| WO | 2010055731 A1 | 5/2010 |
| WO | 2018139405 A1 | 8/2018 |

OTHER PUBLICATIONS

International Search Report in PCT/JP2019/010211, dated May 14, 2019. 4pp.
International Search Report in PCT/JP2019/010212, dated May 14, 2019. 4pp.
International Search Report in PCT/JP2019/010213, dated May 28, 2019. 4pp.

BAKING SLURRY COMPOSITION, GREEN SHEET, METHOD FOR MANUFACTURING GREEN SHEET, METHOD FOR MANUFACTURING SINTERED PRODUCT, AND METHOD FOR MANUFACTURING MONOLITHIC CERAMIC CAPACITOR

CROSS-REFERENCE TO RELATED APPLICATION

This is the U.S. national stage of application No. PCT/JP2019/010213, filed on Mar. 13, 2019.

TECHNICAL FIELD

The present invention relates to baking slurry compositions, green sheets, methods for manufacturing the green sheets, methods for manufacturing sintered products, and methods for manufacturing monolithic ceramic capacitors. More specifically, the present invention relates to a baking slurry composition for producing a sintered product of inorganic powder, a green sheet containing a dried product of the baking slurry composition, a method for manufacturing the green sheet, a method for manufacturing the sintered product, and a method for manufacturing a monolithic ceramic capacitor.

BACKGROUND ART

Conventionally, an organic solvent, such as typically toluene, has been blended as a solvent with a baking binder composition, a baking slurry composition, and the like for producing a ceramic green sheet.

In recent years, emission regulations and the like for organic solvents have been strengthened with concerns about the effects of volatile organic compounds (VOCs) and the like on the environment and the human body. For this reason, a solvent to be blended with a baking binder composition, a baking slurry composition, and the like is required to be converted from an organic solvent into an aqueous solvent.

For example, Patent Literature 1 discloses a ceramic green sheet coating composition which is aqueous and which contains a ceramic raw material, a binder resin, solvent water, and a plasticizer.

It has, however, been difficult for the ceramic green sheet coating composition, which is disclosed in Patent Literature 1 and which is aqueous, to have increased flexibility while maintaining the strength of the sheet. Moreover, there has been a problem with the adhesiveness of a sheet in the case of stacking the sheet formed.

CITATION LIST

Patent Literature

Patent Literature 1: JP 2002-284579 A

SUMMARY OF INVENTION

It is an object of the present invention to provide a baking slurry composition, a green sheet, a method for manufacturing the green sheet, a method for manufacturing a sintered product, and a method for manufacturing a monolithic ceramic capacitor, wherein in the case of forming the baking slurry composition into a sheet, the sheet has increased flexibility while increased strength of the sheet is maintained, and the baking slurry composition is configured to enhance adhesiveness of the sheet in the case of stacking a plurality of such sheets on each other.

A baking slurry composition according to one aspect of the present invention is a baking slurry composition for producing a green sheet. The baking slurry composition contains inorganic powder (B), a polyvinyl alcohol resin (C), acrylic polymer (D), and water. The acrylic polymer (D) has a glass transition temperature higher than or equal to $-50°$ C. and lower than or equal to $30°$ C. and an acid value greater than or equal to 50 mg KOH/g and less than or equal to 200 mg KOH/g. The acrylic polymer (D) has a weight percentage of more than or equal to 0.1 and less than or equal to 5.0 relative to a total solid content of the baking slurry composition.

A green sheet according to one aspect of the present invention contains: inorganic powder (B); a polyvinyl alcohol resin (C); and an acrylic polymer (D). The acrylic polymer (D) has a glass transition temperature higher than or equal to $-50°$ C. and lower than or equal to $30°$ C. and an acid value greater than or equal to 50 mg KOH/g and less than or equal to 200 mg KOH/g. The acrylic polymer (D) has a weight percentage of more than or equal to 0.1 and less than or equal to 5.0 with respect to the green sheet.

A method for manufacturing a green sheet according to one aspect of the present invention includes applying and drying the baking slurry composition.

A method for manufacturing a sintered product according to one aspect of the present invention includes sintering the green sheet or a green sheet obtained by the method for manufacturing the green sheet.

A method for manufacturing a monolithic ceramic capacitor according to one aspect of the present invention includes sintering a stack obtained by stacking a plurality of the green sheets or a plurality of the green sheets obtained by the method for manufacturing the green sheet.

DESCRIPTION OF EMBODIMENTS

A baking slurry composition and a green sheet according to the present embodiment will be described below.

<Baking Slurry Composition>

The baking slurry composition according to the present embodiment is a composition for producing the green sheet. The baking slurry composition contains inorganic powder (B), a polyvinyl alcohol resin (C), acrylic polymer (D), and water. The acrylic polymer (D) has a glass transition temperature higher than or equal to $-50°$ C. and lower than or equal to $30°$ C. and an acid value greater than or equal to 50 mg KOH/g and less than or equal to 200 mg KOH/g. The acrylic polymer (D) has a weight percentage of more than or equal to 0.1 and less than or equal to 5.0 with respect to a total solid content of the baking slurry composition.

In the baking slurry composition of the present embodiment, the polyvinyl alcohol resin (C) may function as a binder. Moreover, the acrylic polymer (D) has the property that the glass transition temperature is higher than or equal to $-50°$ C. and lower than or equal to $30°$ C. and the acid value is greater than or equal to 50 mg KOH/g and less than or equal to 200 mg KOH/g. Thus, the acrylic polymer (D) enables increased strength and flexibility to be imparted to the green sheet formed from the baking slurry composition. Furthermore, since the baking slurry composition contains the inorganic powder (B), baking the baking slurry composition or the green sheet formed from the baking slurry composition pyrolyzes and thereby removes components such as the polyvinyl alcohol resin (C), thereby sintering the inorganic powder (B). As a result, a sintered product of the inorganic powder (B) is formed. Note that in the present specification, the "green sheet" may simply be referred to as a "sheet".

A reason why imparting the increased strength and flexibility to the sheet to be formed from the baking slurry composition is possible has not been clarified, but the following actions are presumed to be the reason.

Both the polyvinyl alcohol resin (C) and the acrylic polymer (D) in the baking slurry composition are soluble in water. This enables the components in the baking slurry composition to efficiently disperse in water although the baking slurry composition contains water as a solvent. Moreover, the polyvinyl alcohol resin (C) has hydroxyl groups in molecules, and these hydroxyl groups easily forms an interaction to a surface of the inorganic powder (B), which may probably contribute to the improvement of the strength of the sheet. Furthermore, the acrylic polymer (D) may have a relatively low glass transition temperature, which may probably impart flexibility to the sheet to be formed from the baking slurry composition. The acrylic polymer (D) has an acid value and thus enables adhesiveness to be imparted to the sheet to be formed from the baking slurry composition. Further, the acid value being in this range (more than or equal to 50 mg KOH/g and less than or equal to 200 mg KOH/g) enables strength, flexibility, and adhesiveness to be well balanced.

According to the present embodiment, it is also possible, when a plurality of the sheets are stacked on each other, to improve adhesiveness between the sheets adjacent to each other. This is probably because the baking slurry composition containing the inorganic powder (B), the polyvinyl alcohol resin (C), and the acrylic polymer (D) enables the sheet to be flexible, and the acrylic polymer (D) which hardly adsorbs the inorganic powder (B) seeps at an interface between the sheets adjacent to each other, thereby providing satisfactory adhesiveness.

Next, the components constituting the baking slurry composition according to the present embodiment will be described in detail.

[Acrylic Polymer (D)]

First, the acrylic polymer (D) will be described. Note that in the present specification, (meth)acryl includes at least one of acryl or methacryl. For example, (meta)acrylate is at least one of acrylate or methacrylate.

The acrylic polymer (D) has a glass transition temperature higher than or equal to −50° C. and lower than or equal to 30° C. and an acid value greater than or equal to 50 mg KOH/g and less than or equal to 200 mg KOH/g. Therefore, the acrylic polymer (D) can contribute to the improvement of the flexibility and strength of the sheet. In addition, the acrylic polymer (D) may improve the storage stability of baking slurry composition. The glass transition temperature of the acrylic polymer (D) is more preferably −40° C. or higher and 20° C. or lower. The acid value of the acrylic polymer (D) is more preferably more than or equal to 60 mg KOH/g and less than or equal to 150 mg KOH/g, and even more preferably more than or equal to 80 mg KOH/g and less than or equal to 130 mg KOH/g. The glass transition temperature and the acid value of the acrylic polymer (D) is achievable by accordingly adjusting the blending, reaction conditions, and the like of components which may be included in the acrylic polymer (D) described later.

Note that the acid value of the acrylic polymer (D) can be measured, for example, by neutralizing titration. Glass transition temperature (Tg) is a value theoretically calculated from the compositional ratio of a monomer component and is a value calculated based on Fox equation below.

$$1/Tg = W_1/Tg_1 + W_2/Tg_2 + \ldots + W_n/Tg_n$$

where n is an integer larger than or equal to 1 and indicates the kind of a monomer used as the monomer. That is, this equation is a calculus equation in the case where the acrylic polymer (D) is obtained by polymerizing n kinds of monomers. $W_1, W_2, \ldots, W_n$ indicate mass fractions of the n kinds of monomers, and $Tg_1, Tg_2, \ldots, Tg_n$ indicate glass transition temperatures of the n kinds of monomers. The unit of the glass transition temperature in the Fox equation is absolute temperature "K", and a value obtained by converting a value calculated based on the above equation into Celsius temperature "° C." is defined as the glass transition temperature of the acrylic polymer (D).

The weight percentage of the acrylic polymer (D) with respect to a total solid content of the baking slurry composition is, as described above, more than or equal to 0.1 and less than or equal to 5.0. Therefore, in the baking slurry composition, the acrylic polymer (D) and the inorganic powder (B) easily form a satisfactory interaction, and it is possible, in the case where a sheet is stacked on a sheet made of baking slurry, to impart adhesiveness between the sheets adjacent to each other. The weight percentage of the acrylic polymer (D) relative to the total solid content of baking slurry composition is more preferably more than or equal to 0.2 and less than or equal to 3.0, and even more preferably more than or equal to 0.5 and less than or equal to 2.5 wt. %.

The acrylic polymer (D) preferably includes a copolymer (D1) of a compound (d1) having a carboxyl group and an ethylenically unsaturated bond and a compound (d2) having an ethylenically unsaturated bond and being different from the compound (d1).

The amounts of the compound (d1) and the compound (d2) in the copolymer (D1) may be accordingly adjusted. For example, the amount of the compound (d1) relative to the total amount of the compound (d1) and the compound (d2) is preferably more than or equal to 5 wt. % and less than or equal to 30 wt. %. In this case, satisfactory adhesiveness, adjustment of adsorbability, hydrophilicity, and the glass transfer point are possible, and therefore, the sheet also has a satisfactory sheet property.

The copolymer (D1) is synthesizable by copolymerizing the compound (d1) and the compound (d2) in the presence of a polymerization initiator.

The compound (d1) includes at least one compound selected from the group consisting, for example, of acrylic acid, methacrylic acid, itaconic acid, 2-(meth)acryloyloxyethyl succinic acid, and 2-(meth)acryloyloxyethyl hexahydrophthalic acid. The compound (d1) preferably contains one or both of acrylic acid and methacrylic acid.

The compound (d2) includes at least one compound selected from the group consisting, for example, of methyl (meta)acrylate, butyl (meta)acrylate, hexyl (meta)acrylate, hydroxyethyl (meta)acrylate, isobutyl (meta)acrylate, cyclohexyl (meta)acrylate, 2-ethylhexyl (meta)acrylate, ethyl (meta)acrylate, glycerine mono(meta)acrylate, 2-hydroxypropyl (meta)acrylate, 4-hydroxybutyl (meta)acrylate, dodecyl (meta)acrylate, and stearyl (meta)acrylate. The compound (d2) preferably contains at least one compound selected from the group consisting of methyl methacrylate, butyl acrylate, and hexyl acrylate.

The polymerization initiator includes at least one selected from the group consisting, for example, of 2,2'-azobisisobutyronitrile, 2,2'-azobis(2,4-dimethylvaleronitrile), 2,2'-azobis(2,4-dimethyl-4-methoxyvaleronitrile), 4-dichlorobenzoyl peroxide, t-butylperoxypivalate, o-methylbenzoyl peroxide, bis-3,5,5-trimethyl hexanoyl peroxide, octanoyl peroxide, t-butylperoxy-2-ethylhexanoate, cyclohexanon peroxide, benzoyl peroxide, methylethyl ketone peroxide, dicumyl peroxide, lauroyl peroxide, diisopropylbenzene hydroperoxide, t-butyl hydroperoxide, di-t-butyl peroxide, and benzoyl peroxide.

Preferably, the compound (d1) contains two or more compounds, and the compound (d2) also contains two or more compounds.

The copolymer (D1) may be neutralized by an amine compound (E). That is, the copolymer (D1) may be synthesized by copolymerizing the compound (d1) and the compound (d2) and causing reaction between the carboxyl group derived from the compound (d1) and the amino group in the amine compound (E). In this case, the copolymer (D1) may have particularly high water solubility, and thus, the acrylic polymer (D) can further improve the storage stability of the baking slurry composition. The amine compound (E) includes at least one selected from the group consisting, for example, of ammonia, triethanolamine, diethanolamine, 2-amino-2-methyl-1-propanol, monoethanolamine, monoisopropanolamine, N-methylethanolamine, dimethylaminopropanol, and morpholine.

The copolymer (D1) is synthesizable by an appropriate method. For example, to produce the copolymer (D1), the compound (d1), the compound (d2), and water are first mixed to prepare a mixed liquid. While the mixed liquid is stirred, a polymerization initiator is added to the mixed liquid, and the mixed liquid is heated to cause polymerization reaction to proceed. Thus, synthesis of the copolymer (D1) is possible. Moreover, the amine compound (E) may be added to the product obtained by the polymerization reaction to cause further neutralizing reaction to synthesize the copolymer (D1). The amount of the amine compound (E) is accordingly adjusted depending on the acid value or the like of the copolymer (D1).

The acrylic polymer (D) preferably has a weight-average molecular weight of more than or equal to 10,000 and less than or equal to 500,000. If the weight-average molecular weight of the acrylic polymer (D) is 10,000 or more, the acrylic polymer (D) hardly reduces the strength of the sheet. If the weight-average molecular weight is 500,000 or less, maintaining the strength of the sheet is possible while the hardness of the sheet is hardly increased, and therefore, it is possible to make it difficult for the flexibility and the adhesiveness to be reduced. Moreover, in this case, it is possible to make it difficult for the solubility of the baking slurry composition in water to be reduced. The weight-average molecular weight of the acrylic polymer (D) is more preferably more than or equal to 50,000 and less than or equal to 300,000, and even more preferably more than or equal to 100,000 and less than or equal to 200,000.

Note that the acrylic polymer (D) is not limited to the copolymer (D1) described above but may include a copolymer other than the copolymer (D1).

The weight-average molecular weight is derived from polystyrene-converted molecular weight distribution obtained from a measurement result by gel permeation chromatography.

[Inorganic Powder (B)]

The inorganic powder (B) may include an appropriate material depending on properties required by the sintered product to be produced from the inorganic powder (B). Specifically, the inorganic powder (B) contains at least one material selected from the group consisting, for example, of oxide, carbide, boride, sulfide, and nitride of metal. The metal contains at least one selected from the group consisting, for example, of Li, Pd, K, Be, Mg, B, Al, Si, Ca, Sr, Ba, Zn, Cd, Ga, In, lanthanide, actinide, Ti, Zr, Hf, Bi, V, Nb, Ta, W, Mn, Fe, Ca, and Ni. When the inorganic powder (B) contains a plurality of metal elements, the inorganic powder (B) may contain one or more components selected from the group consisting, for example, of Macerite, barium titanate, silicate glass, ferrite, lead glass, $CaO \cdot Al_2O_3 \cdot SiO_2$-based inorganic glass, $MgO \cdot Al_2O_3 \cdot SiO_2$-based inorganic glass, and $LiO_2 \cdot Al_2O_3 \cdot SiO_2$-based inorganic glass. The inorganic powder (B) particularly preferably contains at least one material selected from the group consisting of: an oxide containing aluminum, a nitride containing silicon, ferric oxide, and a barium titanate. The oxide containing aluminum includes at least one material selected from the group consisting, for example, of $CaO \cdot Al_2O_3 \cdot SiO_2$-based inorganic glass, $MgO \cdot Al_2O_3 \cdot SiO_2$-based inorganic glass, and $LiO_2 \cdot Al_2O_3 \cdot SiO_2$-based inorganic glass.

Note that the inorganic powder (B) of the present embodiment is an aggregate (powder) of powdery particles having a mean particle diameter of 10 μm or smaller. The mean particle diameter is a median diameter (D50) based on a volume calculated from particle size distribution values measured by, for example, a laser diffraction/scattering method. The mean particle diameter is obtainable with a commercially available particle size analyzer of a laser diffraction/scattering method.

[Polyvinyl Alcohol Resin (C)]

The polyvinyl alcohol resin (C) is a resin which functions as a binder in the baking slurry composition. The polyvinyl alcohol resin (C) can satisfactorily adsorb the inorganic powder (B). This enables the dispersibility of the inorganic powder (B) in the baking slurry composition to be improved. Thus, the polyvinyl alcohol resin (C) may improve the storage stability of baking slurry composition. Note that in the present embodiment, the polyvinyl alcohol resin (C) includes at least one member selected from the group consisting of polyvinyl alcohol obtained by fully saponifying poly vinyl acetate, polyvinyl alcohol obtained by partially saponifying polyvinyl acetate, and a modified product obtained by modifying part of a hydroxyl group or part of an acetic acid group (acetyloxy group) of the structure of polyvinyl alcohol.

The polyvinyl alcohol resin (C) preferably has an average degree of polymerization higher than or equal to 500 and lower than or equal to 9000. In this case, the polyvinyl alcohol resin (C) is readily soluble in water. Moreover, in this case, the polyvinyl alcohol resin (C) more easily adsorbs the inorganic powder (B) and thus enables the dispersibility of the inorganic powder (B) in baking slurry composition to be further improved. The average degree of polymerization of the polyvinyl alcohol resin (C) is more preferably higher than or equal to 500 and lower than or equal to 4000, and even more preferably higher than or equal to 1500 and lower than or equal to 4000. The average degree of polymerization is calculable from a relative viscosity of the polyvinyl alcohol resin (C) to water, the relative viscosity being obtained by using an Ostwald viscometer after full saponification of the polyvinyl alcohol resin (C) with sodium hydroxide.

Components that may be contained in the polyvinyl alcohol resin (C) will be described in further detail.

The polyvinyl alcohol resin (C) preferably contains a nonionic polyvinyl alcohol resin (C1) and an anionic polyvinyl alcohol resin (C2). In this case, the strength of the sheet formed from the baking slurry composition can be further improved. Specifically, the anionic polyvinyl alcohol resin (C2) may have higher hydrophilicity than the nonionic polyvinyl alcohol resin (C1). Therefore, the anionic polyvinyl alcohol resin (C2) can contribute to the further improvement of the strength of the sheet. The polyvinyl alcohol resin (C) contains not only the nonionic polyvinyl alcohol resin (C1) but also the anionic polyvinyl alcohol resin (C2), and therefore, the balance between the physical property and pH of the baking slurry composition can be easily adjusted. Therefore, aggregation and gelation are less likely to occur in the case of paste being produced from the baking slurry composition. The ratio of the nonionic polyvinyl alcohol resin (C1) to the total amount of the nonionic polyvinyl alcohol resin (C1) and the anionic polyvinyl alcohol resin (C2) is preferably more than or equal to 30 wt. % and less than or equal to 90 wt. %, more preferably more than or equal to 40 wt. % and less than or equal to 85 wt. %.

The anionic polyvinyl alcohol resin (C2) preferably contains an anionic polyvinyl alcohol resin (C21) having a carboxyl group. In this case, the interaction between the carboxyl group of the anionic polyvinyl alcohol resin (C21) and the inorganic powder (B) becomes further intensified, and the strength of the sheet can thus be further improved. In addition, in this case, it is easier to adjust the balance between the physical property and the pH of the baking slurry composition. Therefore, it is possible to reduce the occurrence of aggregation and gelation in the case of paste being produced from the baking slurry composition. This enables the physical property of the sheet to be further improved.

Specific examples of commercially available products as the anionic polyvinyl alcohol resin (C21) having a carboxyl group include: KL-506, KL-318, and KL-118 which are names of products manufactured by Kuraray Co., Ltd., GOHSENX T-330, T-350, and T-330H which are names of products manufactured by Nippon Synthetic Chemical Co., Ltd., and AP-17, AT-17, and AF-17 which are names of products manufactured by JAPAN VAM & POVAL CO., LTD.

The polyvinyl alcohol resin (C) may contain, for example, at least two components having differing degrees of saponification. It is also preferable that the polyvinyl alcohol resin (C) contains a component (C3) having a saponification degree of more than or equal to 85 mol % and less than or equal to 99 mol %, and a component (C4) having a saponification degree of more than or equal to 60 mol % and less than 85 mol %. In this case, the component (C3) has a higher percentage of hydroxyl groups than the component (C4), and therefore, the component (C3) can contribute to the improvement of the strength of the sheet formed from the baking slurry composition, while the component (C4) can contribute to the improvement of the flexibility of the sheet. Thus, it is possible to impart further increased strength and flexibility to the sheet to be formed from the baking slurry composition. The component (C4) more preferably has a saponification degree of more than or equal to 60 mol % and less than 80 mol %. The ratio of the component (C3) to the total amount of the component (C3) and the component (C4) is preferably more than or equal to 30 wt. % and less than 90 wt. %, and more preferably more than or equal to 40 wt. % and less than or equal to 85 wt. %. The degree of saponification is calculable by, for example, measuring the polyvinyl alcohol resin in accordance with, for example, JIS K6726 (1994), and based on results of the measuring, it is possible to determine that the degrees of saponification of the components contained in the polyvinyl alcohol resin (C) differ from each other.

The component (C3) and the component (C4) are components distinguished from each other based on the saponification degree as described above. Therefore, the component (C3) and the component (C4) may be either nonionic or anionic. Therefore, the component (C3) and the component (C4) may overlap with a component included in either the nonionic polyvinyl alcohol resin (C1) or the anionic polyvinyl alcohol resin (C2).

The nonionic polyvinyl alcohol resin (C1) preferably contains a nonionic polyvinyl alcohol resin (C11) having a saponification degree of more than or equal to 85 mol % and less than or equal to 99 mol % and a nonionic polyvinyl alcohol resin (C12) having a saponification degree of more than or equal to 60 mol % and less than 85 mol %, and the anionic polyvinyl alcohol resin (C2) preferably contains the anionic polyvinyl alcohol resin (C21) having the carboxyl group. That is, the polyvinyl alcohol resin (C) preferably contains the nonionic polyvinyl alcohol resin (C11), the nonionic polyvinyl alcohol resin (C12), and the anionic polyvinyl alcohol resin (C21). In this case, the nonionic polyvinyl alcohol resin (C11) has a higher percentage of hydroxyl groups than the nonionic polyvinyl alcohol resin (C12) and can therefore contribute to the improvement of the strength of the sheet to be formed from the baking slurry composition. In addition, since the polyvinyl alcohol resin (C21) has the carboxyl group, the contribution of the polyvinyl alcohol resin (C21) to the improvement of the strength of the sheet is even greater. On the other hand, the polyvinyl alcohol resin (C12) can contribute to the improvement of the flexibility of the sheet. Thus, it is possible to impart further increased strength and flexibility to the sheet to be formed from the baking slurry composition. The nonionic polyvinyl alcohol resin (C12) more preferably has a saponification degree of more than or equal to 60 mol % and less than 80 mol %. The ratio of the polyvinyl alcohol resin (C21) to the total amount of the polyvinyl alcohol resin (C11), the polyvinyl alcohol resin (C12), and the polyvinyl alcohol resin (C21) is preferably more than or equal to 10 wt. % and less than or equal to 50 wt. %, more preferably more than or equal to 20 wt. % and less than or equal to 40 wt. %.

It is also preferable that the nonionic polyvinyl alcohol resin (C1) contains a nonionic polyvinyl alcohol resin (C11) having a saponification degree of more than or equal to 85 mol % and less than or equal to 99 mol %, and the polyvinyl alcohol resin (C21) contains an anionic polyvinyl alcohol resin (C211) having a saponification degree of more than or equal to 60 mol % and less than 85 mol % and a carboxyl group. That is, the polyvinyl alcohol resin (C) preferably contains both the nonionic polyvinyl alcohol resin (C1) and the anionic polyvinyl alcohol resin (C211). In this case, the polyvinyl alcohol resin (C11) has a higher percentage of hydroxyl groups than the polyvinyl alcohol resin (C211) and can therefore contribute to the improvement of the strength of the sheet formed from the baking slurry composition. Although the ratio of the hydroxyl group in the polyvinyl alcohol resin (C211) is smaller than that in the polyvinyl alcohol resin (C11), the polyvinyl alcohol resin (C211) has the carboxyl group, and therefore, the polyvinyl alcohol resin (C211) can contribute to the improvement of the strength while the increased flexibility of the sheet is maintained. Thus, it is possible to impart further increased strength and flexibility to the sheet to be formed from the baking slurry composition. The saponification degree of the anionic polyvinyl alcohol resin (C211) having the carboxyl group is more preferably more than or equal to 60 mol % and less than 80 mol %. The ratio of the polyvinyl alcohol resin (C211) to the total amount of the polyvinyl alcohol resin (C11) and the polyvinyl alcohol resin (C211) is preferably more than or equal to 10 wt. % and less than or equal to 70 wt. %, and more preferably more than or equal to 15 wt. % and less than or equal to 60 wt. %.

Specific examples of commercially available products of the nonionic polyvinyl alcohol resin (C11) having a saponification degree of more than or equal to 85 mol % and less than or equal to 99 mol % include PVA-235, PVA-217, PVA-105, PVA-117, PVA-124, PVA-205, and PVA-224 which are names of product manufactured by Kuraray Co., Ltd.; Denka Poval K-05, K-17C, and H-17, B-20 which are names of products manufactured by Denka Corporation; and JC-33, JF-05, JM-23, and JP-03 which are names of product manufactured by JAPAN VAM & POVAL CO., LTD.

Specific examples of commercially products as the nonionic polyvinyl alcohol resin (C12) having a saponification degree of more than or equal to 60 mol % and less than 85 mol % include PVA-505, PVA-405, PVA-417, and PVA-420 which are names of products manufactured by Kuraray Co., Ltd., GOHSENOL KL-05, KL-03, KH-20, KH-17, KP-08R, and NK-05R which are names of products manufactured by the Nippon Synthetic Chemical Industry Co., Ltd., and JL-05E, JL-22E, JL-25E, and JR-05 which are names of products manufactured by JAPAN VAM & POVAL CO., LTD.

Specific examples of commercially available products as the anionic polyvinyl alcohol resin (C211) having a saponification degree of more than or equal to 60 mol % and less than 85 mol % and having a carboxyl group include KL-506 which is a name of a product manufactured by Kuraray Co., Ltd. Note that the anionic polyvinyl alcohol resin (C211) is included in the anionic polyvinyl alcohol resin (C2).

Note that the polyvinyl alcohol resin (C) may contain, for example, a cationic polyvinyl alcohol resin in addition to the nonionic polyvinyl alcohol resin (C1) and the anionic polyvinyl alcohol resin (C2). The polyvinyl alcohol resin (C) may contain the above-described component having a saponification degree of less than 60 mol %.

[Solvent]

In the present embodiment, the baking slurry composition contains water. Components of the baking slurry composition are highly dispersible in water even when water is blended as a solvent. Thus, the baking slurry composition can have high storage stability. Since the baking slurry composition has high dispersibility, a sheet formed from the baking slurry composition has high smoothness. Note that the baking slurry composition may contain a solvent other than water. The solvent other than water may contain at least one selected from the group consisting, for example, of methanol, ethanol, propyl alcohol, isopropyl alcohol, propylene glycol monomethyl ether, ethylene glycol, ethylene glycol monoethyl ether, ethylene glycol monobutyl ether, ethylene glycol monotertiarybutyl ether, polyethylene glycol monomethyl ether, and 2-Hydroxyisobutyric acid methyl ester.

[Other Components]

The baking slurry composition may contain components such as an additive other than the components described above. Examples of the additive include: a dispersant, a plasticizer, a defoamant, a rheology-controlling agent, a wetting agent, an adhesiveness-imparting agent, and a surfactant.

The baking slurry composition according to the present embodiment can be prepared by mixing and stirring, for example, the inorganic powder (B), the polyvinyl alcohol resin (C), the acrylic polymer (D), water, and optionally, additives such as a solvent and a dispersant to disperse these components. Note that the acrylic polymer (D) may be dissolved in water in advance and be mixed in an aqueous solution. The concentration of the aqueous solution of the acrylic polymer (D) in this case may be accordingly adjusted.

The amounts of the components composing the baking slurry composition may be set accordingly. For example, the amount of the amino alcohol compound (A) with respect to the total amount of the inorganic powder of the baking slurry composition and the solid content of the binder is preferably more than or equal to 0.1 wt. % and less than or equal to 8.0 wt. %, more preferably more than or equal to 0.3 wt. % and less than or equal to 5.0 wt. %, and even more preferably more than or equal to 0.5 wt. % and less than or equal to 3.0 wt. %.

The weight percentage of the inorganic powder (B) relative to the total solid content of baking slurry composition is, for example, preferably more than or equal to 75 and less than or equal to 95, more preferably more than or equal to 80 and less than or equal to 95, and even more preferably more than or equal to 85 and less than or equal to 95.

The weight percentage of polyvinyl alcohol resin (C) to the inorganic powder (B) of the baking slurry composition is, for example, preferably more than or equal to 1 and less than or equal to 20, more preferably more than or equal to 5 and less than or equal to 15, and even more preferably more than or equal to 7 and less than or equal to 12.

The amount of water relative to the total amount of the baking slurry composition is preferably more than or equal to 6 wt. % and less than or equal to 45 wt. %, more preferably more than or equal to 8 wt. % and less than or equal to 40, and even more preferably more than or equal to 10 wt. % and less than or equal to 37 wt. %.

Note that "total solids content of the baking slurry composition" refers to the total amount of the components excluding the solvent from the baking slurry.

The baking slurry composition may include an aqueous solution of the polyvinyl alcohol resin (C), that is, the polyvinyl alcohol resin (C) may be dissolved in water in advance and then may be mixed with other components to prepare the baking slurry composition.

The baking slurry composition preferably has a pH of higher than or equal to 5 and lower than 8. In this case, agglomeration, gelation, and phase separation of the baking slurry composition are less likely to occur, and therefore, the storage stability of the baking slurry composition can be further improved. Thus, it is possible to impart flexibility to the sheet to be formed from the baking slurry composition. The pH of the baking slurry composition is more preferably 6 or higher and 7 or lower. The pH of the baking slurry composition is adjustable, for example, by accordingly adjusting blending amounts of the amino alcohol compound (A) and the polyvinyl alcohol resin (C) (in particular, the anionic polyvinyl alcohol resin (C2)).

Next, the green sheet formed from the baking slurry composition described above, the sintered product, and a ceramic capacitor will be described in detail.

<Green-Sheet>

A sheet (green sheet) according to the present embodiment contains: inorganic powder (B); a polyvinyl alcohol resin (C); and an acrylic polymer (D). The acrylic polymer (D) has a glass transition temperature higher than or equal to −50° C. and lower than or equal to 30° C. and an acid value greater than or equal to 50 mg KOH/g and less than or equal to 200 mg KOH/g. The acrylic polymer (D) has a weight percentage of more than or equal to 0.1 and less than or equal to 5.0 relative to the sheet. Thus, the sheet has increased strength and flexibility. Therefore, forming a sheet from the baking slurry composition enables flexibility to be imparted to the sheet as described above and thus enables the sheet to be hardly warped. This enables the adhesiveness of the sheet to a base material such as carrier film to be improved. Therefore, it is also possible to reduce the formation of cracks in the sheet. In addition, in the present embodiment, it is possible to realize high adhesiveness between adjacent sheets in the case where a plurality of sheets are stacked.

The inorganic powder (B), the polyvinyl alcohol resin (C), and the acrylic polymer (D) have the same configurations as those of the above-described baking slurry composition, and therefore, duplicate descriptions thereof are omitted.

The sheet (green sheet) can be produced, for example, as described below.

After preparing the baking slurry composition described above, the baking slurry composition is applied to a base material and is optionally dried to obtain a sheet. Any appropriate method is adoptable as a method for applying the baking slurry composition to the base material, and examples of the method include a doctor blade method, a screen printing method, and a dispensing method. Any appropriate base material is adoptable as the base material to which the baking slurry composition is to be applied, and examples of the base material may include carrier film such as polyethylene terephthalate (PET) film.

<Sintered Product and Ceramic Capacitor>

The sheet is suitably utilizable as a ceramic green sheet for producing a monolithic ceramic capacitor and the like. Baking the sheet pyrolyzes and removes components such as the polyvinyl alcohol resin (C) and the acrylic polymer (D), thereby sintering the inorganic powder (B). This forms a sintered product of the inorganic powder (B), and the sintered product may form appropriate elements such as electrodes and conductor wiring. For example, appropriate elements such as a conductive layer, a dielectric layer, and an insulating layer are producible from the sheet. Specifically, for example, the sheet is adoptable to produce a dielectric layer in a monolithic ceramic capacitor, an insulating layer in a ceramic circuit board, and the like. As described above, the sheet has increased strength and flexibility, and therefore, also when a plurality of the sheets are stacked to produce a monolithic ceramic capacitor, reducing the thickness of the monolithic ceramic capacitor is easily possible. According to the present embodiment, it is in particular possible, when a plurality of the sheets are stacked on each other, to improve adhesiveness between the sheets adjacent to each other.

The monolithic ceramic capacitor can be produced from the sheet by the following method.

First, the sheet is cut to obtain sheets having an appropriate dimension, and a suitable number of the sheets are stacked on each other according to the purpose. Subsequently, pressure is applied to compress the sheets stacked, and then the sheets stacked are put in a baking oven and are then baked. The dielectric layer in the monolithic ceramic capacitor, the insulating layer in the ceramic circuit board, and the like are thus produced.

The pressure to be applied to the sheets stacked is not particularly limited but may be accordingly set depending on, for example, the number of stacked sheets, and may be, for example, more than or equal to 10 MPa and less than or equal to 100 MPa. The baking condition may accordingly be set depending on the temperature at which the inorganic powder (B) is to be sintered, but the heating temperature may be set to, for example, 500° C. or higher and 1500° C. or lower, and the heating time may be set to, for example, 1 hour or longer and 24 hours or shorter. Note that the monolithic ceramic capacitor produced from the plurality of sheets has been described above, but a single-layered ceramic capacitor may be produced from a single sheet having an appropriate dimension.

EXAMPLES

The present invention will be described further in detail with reference to examples below. However, the present invention is not limited to the following examples.

(1) Preparation of Baking Slurry Compositions (1-1) Synthesis of Acrylic Aqueous Solutions 1 to 8

Acrylic aqueous solutions 1 to 8 of [Acrylic Polymer] shown in Tables 2 and 3 were synthesized and prepared as described below.

Components shown in the field [Monomer Components] in Table 1 and 100 parts by mass of water were put in a four-necked flask which has a volume of 1 L and to which a refluxing cooler, a temperature gauge, an air blow tube, and a stirrer are attached, and the components were mixed, thereby preparing a mixture. While the mixture was stirred, 2 parts by mass of benzoyl peroxide serving as a polymerization initiator was added. While the mixture was further stirred, the temperature of the mixture was increased to 80° C. After the temperature of the mixture reached 80° C., the mixture was stirred for an additional 5 hours at 80° C. Subsequently, the temperature in the flask was allowed to cool to a room temperature, and then 10 parts by mass of diethanolamine of an amine component was slowly added to neutralize the mixture. Thus, acrylic aqueous solutions 1 to 8 were obtained. Note that acrylic aqueous solutions 1 to 8 thus obtained have a pH of about 7. The weight-average molecular weight, solid content, glass transition temperature Tg, and solid content acid value of acrylic aqueous solutions 1 to 8 were as shown in Table 1.

TABLE 1

| | | Synthesis Example (Acrylic Aqueous Solutions 1 to 8) | | | | | | | |
|---|---|---|---|---|---|---|---|---|---|
| | | 1 | 2 | 3 | 4 | 5 | 6 | 7 | 8 |
| Monomer Composition (parts by mass) | MMA (Methyl Methacrylate) | 9 | 39 | 15 | 10 | | 20 | | 62 |
| | BA (Butyl Acrylate) | 77 | 47 | 77 | | | 78 | | 24 |
| | HA (Hexyl Acrylate) | | | | 65 | 64 | | 86 | |
| | Aa (Acrylic Acid) | 7 | 7 | 4 | 13 | 36 | 1 | 7 | 7 |
| | Maa (Methacrylic Acid) | 7 | 7 | 4 | 12 | | 1 | 7 | 7 |
| Weight-Average Molecular Weight (Mw) | | 200000 | 200000 | 200000 | 200000 | 200000 | 200000 | 200000 | 200000 |
| Solid Content (wt. %) | | 30 | 30 | 30 | 30 | 30 | 30 | 30 | 30 |
| Resin Tg (° C.) | | −30 | 10 | −30 | −30 | −30 | −30 | −60 | 50 |
| Solid Content Acid Value (mgKOH/g) | | 100 | 100 | 60 | 180 | 300 | 10 | 100 | 100 |

(1-2) Preparation of Baking Slurry Compositions [Examples 1 to 11 and Comparative Examples 1 to 6]

Components shown in column A (columns corresponding to "inorganic powder", "solvent", "dispersant" and "plasticizer") in Tables 2 and 3 were placed in a ball mill to obtain a mixture and were stirred with the ball mill for 30 minutes to disperse the mixture. Subsequently, components in column B (columns corresponding to "defoamant", "polyvinyl alcohol resin", and "acrylic polymer") in Tables 2 and 3 were further added and stirred in the ball mill for 8 hours for dispersion, thereby preparing a baking slurry composition. Details of the components shown in Tables 2 and 3 are as shown below.

[Inorganic Powder]
Iron Oxide

[Dispersant]
Polyacrylic acid ammonium salt aqueous solution (Micro-Sol KE-511 manufactured by GOO chemical Co., Ltd., 40% aqueous solution, glass transition temperature 100° C., solid content acid value 750 mg KOH/g).

[Plasticizer]
Diethanolamine

[Defoamant]
SN-Defoamer 470 (manufactured by San Nopco Limited: a mixture of polyether, modified silicone compounds, and the like).
SN-Deformer 485 (manufactured by San Nopco Limited: a mixture of special polyether nonionic surfactant).

[Polyvinyl Alcohol Resin]
PVA-235 aqueous solution (manufactured by Kuraray Co., Ltd., concentration: 15%, degree of saponification: 88 mol %, and average degree of polymerization: 3500).
PVA-505 aqueous solution (concentration: 30%, degree of saponification: 74 mol %, and polymerization degree: 500).
KL-506 aqueous solution (manufactured by Kuraray Co., Ltd., density: 30%, degree of saponification: 77 mol %, carboxyl group is contained, average degree of polymerization: 600).
KL-318 aqueous solution (manufactured by Kuraray Co., Ltd., density: 30%, degree of saponification: 88 mol %, carboxyl group is contained, average degree of polymerization: 1800).
GOHSENOL KL-05 aqueous solution (manufactured by Nippon Synthetic Chemical Co., Ltd., concentration: 30%, degree of saponification: 80 mol %, average degree of polymerization: 500).

Note that the polyvinyl alcohol resins described in [Polyvinyl Alcohol Resin] were mixed by adjusting respective aqueous solutions containing the polyvinyl alcohol resins dissolved in water to achieve the concentrations described in the brackets. Values in the tables indicate the amounts of the respective aqueous solutions of the polyvinyl alcohol resins at the concentrations.

(2) Evaluation Test

An evaluation test of baking slurry resin compositions and sheets produced from the baking slurry resin compositions in the examples and comparative examples obtained in (1) was conducted as described below. The results are shown in the tables below.

(2-1) Viscosity

The viscosities of the baking slurry compositions prepared in (1) were measured with RE-215SR/U, which is a model number of a product manufactured by Toki Sangyo Co., Ltd. at 25° C. at a rotational speed of 50 rpms for 2 minutes.

(2-2) Slurry Stability (Storage Stability)

The baking slurry compositions prepared in (1) were left to stand at an ordinary temperature and stored for 4 weeks. During the 4-week period after adjustment of the baking slurry compositions, the baking slurry compositions were visually observed to check the presence or absence of phase separations, the presence or absence of sedimentation, and changes in appearance, and evaluated in accordance with the criteria described below.

A: Four weeks after the production, no change in appearance was observed.
B: Two weeks after the production, there was no change in appearance, but a change was observed after 4 weeks.
C: A change was observed within 2 weeks after 1 day had elapsed since the production.
D: A state change was observed within 1 day after the production, and the slurry composition was in an uneven state.

(2-3) Pyrolysis Behavior

In (1), the baking slurry compositions were prepared without blending the inorganic powder described in [Inorganic Powder], coatings were produced from these compositions, and while the coatings were heated from a room temperature to 550° C. under the presence of air at a rate of temperature rise of 10° C./min, weight changes of the coatings were measured by using a difference dynamic differential thermal balance (model number TG8120 manufactured by Rigaku Corporation). As a result, a weight reduction rate at 550° C. relative to the weight of each baking slurry composition at the room temperature was calculated and evaluated according to the following criteria.

A: The weight reduction rate of the baking slurry composition at 550° C. was more than or equal to 99 wt. %, and no calcination residue was observed.
B: The weight reduction rate of the baking slurry composition at 550° C. was more than or equal to 99 wt. %, but few baking residues were observed.
C: The weight reduction rate of the baking slurry composition at 550° C. was more than or equal to 95 wt. % and less than 99 wt. %.
D: The weight reduction rate of the baking slurry composition at 550° C. was less than 95 wt. %, and a residue such as carbide was visually observed after the measurements were completed.

Note that in this evaluation, a coating produced from the baking slurry composition without adding the inorganic powder was evaluated for the sake of measurement, but this does not affect the evaluation of the pyrolysis behavior.

(2-4) Smoothness

The baking slurry compositions prepared in (1) were applied on polyethylene terephthalate (PET) film (dimension: 100 mm×100 mm) with a four-sided applicator (model No. 112 manufactured by Taiyu Kizai Co., Ltd.) to have a thickness of about 100 μm to form a coating. The appearance of each coating thus obtained was observed and evaluated according to the following criteria.

A: No irregularities, aggregates, bubble marks, warpage, or the like were observed in the coating, and the coating surface is uniform and smooth.
B: The coating surface is uniform and smooth to the extent that there is no problem as a product, although some irregularities, aggregates, bubble marks, warpage, etc. were observed in the coating.
C: irregularities, aggregates, bubble marks, warpage, or the like in the coating are observed in less than 50% of the area of the coating, and a uniform and smooth coating cannot be obtained.

D: irregularities, aggregates, bubble marks, warpage, or the like in the coating are observed in 50% or more of the area of the coating, and a uniform and smooth coating cannot be obtained.

(2-5) Strength

The coatings formed on the PET film in (2-4) were peeled off slowly by hand in a direction perpendicular to the surface of the PET film, and the strengths of the coatings were evaluated in accordance with the following criteria.

A: The coating is peelable from the PET film and can withstand tension. In addition, the strength is maintained after 2 weeks or more.

B: The coating is peelable from the PET film and can withstand tension, but a reduction of the strength is observed after 2 weeks or more.

C: The coating is peelable from the PET film but easily tears when pulled.

D: The coating cannot be peeled from the PET film or tears when peeled.

(2-6) Flexibility

The coatings formed on the PET film in (2-4) were bent to about 180° to check whether or not cracks were formed or breakage occurred in the coatings, and the coatings were evaluated according to the following criteria.

A: After the coating was bent at 180° more than 20 times, neither cracks nor breakage occurred in the coating.

B: After the coating was bent at 180° twice or more, neither cracks nor breakage occurred in the coating, but after the coating was bent repeatedly 20 times or more, cracks and breakages occurred in the coating.

C: After the coating was bent at 180° more than twice, cracks and/or breakages occurred in the coating.

D: When the coating was bent at 180° at least once, cracks and cracks occurred in the coating.

(2-7) Adhesiveness

Each coating formed on the PET film in (2-4) was cut into coating pieces having a square shape (3-cm square) having a length of 3 cm and a width of 3 cm, 10 coating pieces were stacked, and then pressed using a press to remove the stacked layer film, thereby evaluating the adhesiveness according to the following criteria. Note that pressure was applied at 80° C. for 10 MPa×5 minutes.

A: The adhesiveness of the coating is strong and cannot be peeled off at the interface. In addition, the adhesiveness is maintained after 2 weeks or more.

B: The adhesiveness of the coating is strong and cannot be peeled off at the interface, but the adhesiveness decreases after 2 weeks or more.

C: If the coating is peeled off strongly by hand, the coating peels off at the interface.

D: The coatings are not bonded to each other at all.

The results of the evaluations are given in the following Tables 2 and 3.

TABLE 2

| | | | Example | | | | | |
|---|---|---|---|---|---|---|---|---|
| | | | 1 | 2 | 3 | 4 | 5 | 6 |
| A | Inorganic Powder | Ferric Oxide | 20 | 20 | 20 | 20 | 20 | 20 |
| | Solvent | Water | 4 | 4 | 4 | 4 | 4 | 4 |
| | Dispersant | Polyaerylic Acid Ammonium Salt Aqueous Solution | 0.2 | 0.2 | 0.2 | 0.2 | 0.2 | 0.2 |
| | Plasticizer | Diethanolamine | 0.3 | 0.3 | 0.3 | 0.3 | 0.3 | 0.3 |
| B | Defoamant | SN Defoamer 470 | 0.05 | 0.05 | 0.05 | 0.05 | 0.05 | 0.05 |
| | | SN Defoamer 485 | 0.05 | 0.05 | 0.05 | 0.05 | 0.05 | 0.05 |
| | Polyvinyl Alcohol Resin | PVA-235 Aqueous Solution | 7 | 7 | 7 | 7 | 7 | 7 |
| | | PVA-505 Aqueous Solution | | | | | | |
| | | KL-506 Aqueous Solution | 2 | | | 2 | 2 | 2 |
| | | KL-318 Aqueous Solution | | 2 | | | | |
| | | Gohsenol KL-05 Aqueous Solution | | | 2 | | | |
| | Acrylic Polymer | Acrylic Aqueous Solution 1 | 1 | 1 | | | | |
| | | Acrylic Aqueous Solution 2 | | | 1 | 1 | | |
| | | Acrylic Aqueous Solution 3 | | | | | 1 | |
| | | Acrylic Aqueous Solution 4 | | | | | | 1 |
| | | Acrylic Aqueous Solution 5 | | | | | | |
| | | Acrylic Aqueous Solution 6 | | | | | | |
| | | Acrylic Aqueous Solution 7 | | | | | | |
| | | Acrylic Aqueous Solution 8 | | | | | | |
| Evaluation | Slurry Characteristics | Viscosity mPa · s | 3000 | 5000 | 3000 | 3000 | 2000 | 5000 |
| | | Slurry Stability | A | A | A | A | A | B |
| | | Pyrolysis Behavior | A | A | A | A | A | B |
| | Sheet Characteristics | Smoothness | A | A | A | A | A | B |
| | | Strength | A | A | B | A | B | A |
| | | Flexibility | A | B | A | B | A | B |
| | | Adhesiveness | A | A | A | A | B | A |

| | | | Example | | | | |
|---|---|---|---|---|---|---|---|
| | | | 7 | 8 | 9 | 10 | 11 |
| A | Inorganic Powder | Ferric Oxide | 20 | 20 | 20 | 20 | 20 |
| | Solvent | Water | 4 | 4 | 4 | 4 | 4 |
| | Dispersant | Polyaerylic Acid Ammonium Salt Aqueous Solution | 0.2 | 0.2 | 0.2 | 0.2 | 0.2 |
| | Plasticizer | Diethanolamine | 0.3 | 0.3 | 0.3 | 0.3 | 0.3 |

TABLE 2-continued

| | | | | | | | |
|---|---|---|---|---|---|---|---|
| B | Defoamant | SN Defoamer 470 | 0.05 | 0.05 | 0.05 | 0.05 | 0.05 |
| | | SN Defoamer 485 | 0.05 | 0.05 | 0.05 | 0.05 | 0.05 |
| | Polyvinyl Alcohol Resin | PVA-235 Aqueous Solution | 7 | 7 | 7 | 7 | 6 |
| | | PVA-505 Aqueous Solution | | | | | |
| | | KL-506 Aqueous Solution | 2.5 | 1 | | | |
| | | KL-318 Aqueous Solution | | | | | 2 |
| | | Gohsenol KL-05 Aqueous Solution | | | | | |
| | Acrylic Polymer | Acrylic Aqueous Solution 1 | 0.5 | 2 | 2 | 1 | 1 |
| | | Acrylic Aqueous Solution 2 | | | | | |
| | | Acrylic Aqueous Solution 3 | | | | | |
| | | Acrylic Aqueous Solution 4 | | | | | |
| | | Acrylic Aqueous Solution 5 | | | | | |
| | | Acrylic Aqueous Solution 6 | | | | | |
| | | Acrylic Aqueous Solution 7 | | | | | |
| | | Acrylic Aqueous Solution 8 | | | | | |
| Evaluation | Slurry Characteristics | Viscosity mPa·s | 3000 | 3000 | 2000 | 2000 | 4000 |
| | | Slurry Stability | A | B | B | A | A |
| | | Pyrolysis Behavior | A | B | B | A | A |
| | Sheet Characteristics | Smoothness | A | B | B | A | A |
| | | Strength | A | B | B | B | A |
| | | Flexibility | B | A | B | A | A |
| | | Adhesiveness | B | A | A | A | A |

TABLE 3

| | | | Comparative Example | | | | | |
|---|---|---|---|---|---|---|---|---|
| | | | 1 | 2 | 3 | 4 | 5 | 6 |
| A | Inorganic Powder | Ferric Oxide | 20 | 20 | 20 | 20 | 20 | 20 |
| | Solvent | Water | 4 | 4 | 4 | 4 | 4 | 4 |
| | Dispersant | Polyacrylic Acid Ammonium Salt Aqueous Solution | 0.2 | 0.2 | 0.2 | 0.2 | 0.2 | 0.2 |
| | Plasticizer | Diethanolamine | 0.3 | 0.3 | 0.3 | 0.3 | 0.3 | 0.3 |
| B | Defoamant | SN Defoamer 470 | 0.05 | 0.05 | 0.05 | 0.05 | 0.05 | 0.05 |
| | | SN Defoamer 485 | 0.05 | 0.05 | 0.05 | 0.05 | 0.05 | 0.05 |
| | Polyvinyl Alcohol Resin | PVA-235 Aqueous Solution | | 7 | 7 | 7 | 7 | 7 |
| | | PVA-505 Aqueous Solution | | | | | | |
| | | KL-506 Aqueous Solution | | 2 | 2 | 2 | 2 | 3 |
| | | KL-318 Aqueous Solution | | | | | | |
| | | Gohsenol KL-05 Aqueous Solution | | | | | | |
| | Acrylic Polymer | Acrylic Aqueous Solution 1 | 7 | | | | | |
| | | Acrylic Aqueous Solution 2 | | | | | | |
| | | Acrylic Aqueous Solution 3 | | | | | | |
| | | Acrylic Aqueous Solution 4 | | | | | | |
| | | Acrylic Aqueous Solution 5 | | 1 | | | | |
| | | Acrylic Aqueous Solution 6 | | | 1 | | | |
| | | Acrylic Aqueous Solution 7 | | | | 1 | | |
| | | Acrylic Aqueous Solution 8 | | | | | 1 | |
| Evaluation | Slurry Characteristics | Viscosity mPa·s | 500 | 3000 | 3000 | 3000 | 3000 | 4000 |
| | | Slurry Stability | D | D | A | A | A | A |
| | | Pyrolysis Behavior | C | C | A | C | A | B |
| | Sheet Characteristics | Smoothness | D | D | A | A | A | B |
| | | Strength | D | A | D | D | A | B |
| | | Flexibility | A | D | A | A | D | B |
| | | Adhesiveness | A | A | D | A | D | C |

SUMMARY

As can be seen from the description above, a baking slurry composition of a first aspect according to the present invention is a baking slurry composition for producing a green sheet. The baking slurry composition contains inorganic powder (B), a polyvinyl alcohol resin (C), acrylic polymer (D), and water. The acrylic polymer (D) has a glass transition temperature higher than or equal to −50° C. and lower than or equal to 30° C. and an acid value greater than or equal to 50 mg KOH/g and less than or equal to 200 mg KOH/g. The acrylic polymer (D) has a weight percentage of more than or equal to 0.1 and less than or equal to 5.0 relative to a total solid content of the baking slurry composition.

The first aspect provides the advantage that in the case of forming the baking slurry composition into a sheet, the sheet can have increased flexibility while increased strength of the sheet is maintained, and adhesiveness between the sheets is excellent in the case of forming the baking slurry composition into sheets and stacking the sheets.

In a baking slurry composition of a second aspect referring to the first aspect, the acrylic polymer (D) includes a copolymer (D1) of a compound (d1) having a carboxyl group and an ethylenically unsaturated bond and a compound (d2) having an ethylenically unsaturated bond and being different from the compound (d1).

The second aspect enables, in this case, the adsorbability to the inorganic powder, the hydrophilicity, and the glass transition point to be easily adjusted.

In a baking slurry composition of a third aspect referring to the second aspect, the copolymer (D1) is neutralized by an amine compound (E).

According to the third aspect, the baking slurry composition may contain a copolymer (D1) which is highly water soluble, and therefore, the acrylic polymer (D) can improve the storage stability of baking slurry composition. Further, in this case, it is possible to further improve the adhesiveness in the case of stacking sheets.

In a baking slurry composition of a fourth aspect referring to any one of the first to third aspects, the acrylic polymer (D) has a weight-average molecular weight of more than or equal to 10,000 and less than or equal to 500,000.

According to the fourth aspect, in this case, the strength, flexibility, adhesiveness, and water-solubility of the sheet can be ensured.

In a baking slurry composition of a fifth aspect referring to any one of the first to fourth aspects, the polyvinyl alcohol resin (C) contains a component (C3) having a saponification degree of more than or equal to 85 mol % and less than or equal to 99 mol %, and a component (C4) having a saponification degree of more than or equal to 60 mol % and less than 85 mol %.

According to the fifth aspect, the component (C3) has a higher percentage of hydroxyl groups than the component (C4). Therefore, the component (C3) can contribute to the improvement of the strength of the sheet produced from the baking slurry composition. On the other hand, the component (C4) can contribute to an improvement in the flexibility of the sheet. Thus, it is possible to impart further increased strength and flexibility to the sheet formed from the baking slurry composition.

In a baking slurry composition of a sixth aspect referring to any one of the first to fifth aspects, the polyvinyl alcohol resin (C) contains a nonionic polyvinyl alcohol resin (C1) and an anionic polyvinyl alcohol resin (C2).

According to the sixth aspect, it is possible to further improve the strength of the sheet to be produced from the baking slurry composition.

In a baking slurry composition of a seventh aspect referring to the sixth aspect, the anionic polyvinyl alcohol resin (C2) contains a polyvinyl alcohol resin (C21) having a carboxyl group.

According to the seventh aspect, the interaction between the carboxyl group of the anionic polyvinyl alcohol resin (C21) and the inorganic powder (B) becomes stronger, and the strength of the sheet can thus be further improved. In addition, in this case, it is easier to adjust the balance between the physical property and the pH of the baking slurry composition. Therefore, it is possible to reduce the occurrence of aggregation and gelation in the case of paste being produced from the baking slurry composition, which enables physical property of the sheet to be further improved.

In a baking slurry composition of an eighth aspect referring to the seventh aspect, the nonionic polyvinyl alcohol resin (C1) contains a nonionic polyvinyl alcohol resin (C11) having a saponification degree of more than or equal to 85 mol % and less than or equal to 99 mol %, and a nonionic polyvinyl alcohol resin (C12) having a saponification degree of more than or equal to 60 mol % and less than 85 mol %.

According to the eighth aspect, the polyvinyl alcohol resin (C11) has a higher percentage of hydroxyl groups than the polyvinyl alcohol resin (C12) and can therefore contribute to the improvement of the strength of the sheet produced from the baking slurry composition. In addition, since the polyvinyl alcohol resin (C21) has a carboxyl group, the contribution of the polyvinyl alcohol resin (C21) to the improvement of the strength of the sheet is even greater. On the other hand, the polyvinyl alcohol resin (C12) can contribute to the improvement of the flexibility of the sheet. Thus, it is possible to impart further increased strength and flexibility to the sheet to be produced from the baking slurry composition.

In a baking slurry composition of a ninth aspect referring to the eight aspect, the nonionic polyvinyl alcohol resin (C1) contains a nonionic polyvinyl alcohol resin (C11) having a saponification degree of more than or equal to 85 mol % and less than or equal to 99 mol %, and the polyvinyl alcohol resin (C21) contains an anionic polyvinyl alcohol resin (C211) having a saponification degree of more than or equal to 60 mol % and less than 85 mol % and a carboxyl group.

According to the ninth aspect, the polyvinyl alcohol resin (C11) has a higher percentage of hydroxyl groups than the polyvinyl alcohol resin (C21) and can therefore contribute to the improvement of the strength of the sheet to be produced from the baking slurry composition. Although the ratio of the hydroxyl group in the polyvinyl alcohol resin (C211) is smaller than that in the polyvinyl alcohol resin (C12), the polyvinyl alcohol resin (C211) has a carboxyl group, and therefore, the polyvinyl alcohol resin (C211) can contribute to the improvement of the strength while the increased flexibility of the sheet is maintained. Thus, it is possible to impart further increased strength and flexibility to the sheet to be produced from the baking slurry composition.

A green sheet of a tenth aspect contains: inorganic powder (B); a polyvinyl alcohol resin (C); and an acrylic polymer (D). The acrylic polymer (D) has a glass transition temperature higher than or equal to $-50°$ C. and lower than or equal to $30°$ C. and an acid value greater than or equal to 50 mg KOH/g and less than or equal to 200 mg KOH/g. The acrylic polymer (D) has a weight percentage of more than or equal to 0.1 and less than or equal to 5.0% relative to the green sheet.

According to the tenth aspect, the green sheet can have increased strength and flexibility. Therefore, it is possible to make it difficult for the sheet to be warped. This enables the adhesiveness of the sheet to a base material such as carrier film to be improved. Therefore, it is also possible to reduce the formation of cracks in the green sheet.

The green sheet of an eleventh aspect referring to the tenth aspect is a green sheet adopted to produce a ceramic capacitor containing a sintered product of the inorganic powder (B), the sintered product being obtained by baking the green sheet.

According to the eleventh aspect, the sheet is suitably utilizable as a ceramic green sheet for producing a monolithic ceramic capacitor or the like.

A method for manufacturing a green sheet of a twelfth aspect includes applying and drying the baking slurry composition of any one of the first to ninth aspects.

According to the twelfth aspect, it is possible to provide a green sheet having increased flexibility while the increased strength of the green sheet is maintained.

A method for manufacturing a sintered product of a thirteenth aspect includes baking the green sheet of the tenth or eleventh aspect or the green sheet obtained by the method of the twelfth aspect.

According to the thirteenth aspect, the green sheet has increased strength and flexibility, and therefore, also when a plurality of the green sheets are stacked to produce a monolithic ceramic capacitor, adhesiveness between the sheets adjacent to each other is excellent and reducing the thickness of the monolithic ceramic capacitor is easily possible.

A method for manufacturing a monolithic ceramic capacitor of a fourteenth aspect includes baking a stack obtained by stacking a plurality of the green sheets of the tenth or eleventh aspect on each other or obtained by stacking a plurality of the green sheets obtainable by the method for manufacturing the green sheet of the twelfth aspect on each other.

According to the fourteenth aspect, even in the case of a stack including a plurality of sheets stacked on each other, the adhesiveness between the sheets adjacent to each other can be increased, and reducing the thickness of the monolithic ceramic capacitor is easily possible.

The invention claimed is:

1. A baking slurry composition for producing a green sheet, the baking slurry composition comprising:
   inorganic powder (B);
   a polyvinyl alcohol resin (C);
   acrylic polymer (D); and
   water,
   the acrylic polymer (D) having a glass transition temperature higher than or equal to −50° C. and lower than or equal to 30° C. and an acid value greater than or equal to 50 mg KOH/g and less than or equal to 200 mg KOH/g,
   the acrylic polymer (D) having a weight percentage of more than or equal to 0.1 and less than or equal to 5.0 relative to a total solid content of the baking slurry composition, and
   the polyvinyl alcohol resin (C) containing
      a component (C3) having a saponification degree of more than or equal to 85 mol % and less than or equal to 99 mol %, and
      a component (C4) having a saponification degree of more than or equal to 60 mol % and less than 85 mol %.

2. The baking slurry composition of claim 1, wherein
   the acrylic polymer (D) includes a copolymer (D1) of a compound (d1) and a compound (d2),
   the compound (d1) has a carboxyl group and an ethylenically unsaturated bond, and
   the compound (d2) has an ethylenically unsaturated bond and is different from the compound (d1).

3. The baking slurry composition of claim 2, wherein
   the copolymer (D1) is neutralized by an amine compound (E).

4. The baking slurry composition of claim 1, wherein
   the acrylic polymer (D) has a weight-average molecular weight of more than or equal to 10,000 and less than or equal to 500,000.

5. A method for manufacturing a green sheet, the method comprising applying and drying the baking slurry composition of claim 1.

6. A baking slurry composition for producing a green sheet, the baking slurry composition comprising:
   inorganic powder (B);
   a polyvinyl alcohol resin (C);
   acrylic polymer (D); and
   water,
   the acrylic polymer (D) having a glass transition temperature higher than or equal to −50° C. and lower than or equal to 30° C. and an acid value greater than or equal to 50 mg KOH/g and less than or equal to 200 mg KOH/g,
   the acrylic polymer (D) having a weight percentage of more than or equal to 0.1 and less than or equal to 5.0 relative to a total solid content of the baking slurry composition, and
   the polyvinyl alcohol resin (C) containing a nonionic polyvinyl alcohol resin (C1) and an anionic polyvinyl alcohol resin (C2).

7. The baking slurry composition of claim 6, wherein
   the anionic polyvinyl alcohol resin (C2) contains a polyvinyl alcohol resin (C21) having a carboxyl group.

8. The baking slurry composition of claim 7, wherein
   the nonionic polyvinyl alcohol resin (C1) contains a nonionic polyvinyl alcohol resin (C11) having a saponification degree of more than or equal to 85 mol % and less than or equal to 99 mol %, and a nonionic polyvinyl alcohol resin (C12) having a saponification degree of more than or equal to 60 mol % and less than 85 mol %.

9. The baking slurry composition of claim 8, wherein
   the nonionic polyvinyl alcohol resin (C1) contains a nonionic polyvinyl alcohol resin (C11) having a saponification degree of more than or equal to 85 mol % and less than or equal to 99 mol %, and
   the polyvinyl alcohol resin (C21) contains an anionic polyvinyl alcohol resin (C211) having a saponification degree of more than or equal to 60 mol % and less than 85 mol % and a carboxyl group.

10. A method for manufacturing a green sheet, the method comprising applying and drying the baking slurry composition of claim 6.

* * * * *